Sept. 27, 1955 W. KAUFMAN 2,718,705
MICROMETER VERNIER ATTACHMENT
Filed Nov. 30, 1953

INVENTOR.
WILLIAM KAUFMAN
BY
Alfred E. Miller
ATTORNEY

2,718,705

MICROMETER VERNIER ATTACHMENT

William Kaufman, Port Chester, N. Y.

Application November 30, 1953, Serial No. 394,990

6 Claims. (Cl. 33—166)

This invention relates to an improvement for use with a micrometer and more particularly to a device utilized with a micrometer which acts as a ratchet stop and also contains a vernier scale.

An object of this invention is to provide a micrometer device that may be inserted over the thimble of most commercially available micrometers and permits more accurate measurements and greatly reduces the probability of disturbance of the setting and hence error upon removal of the micrometer from the work piece to be measured.

A further object of this invention is the provision of an easily-operated, precise measuring instrument which is relatively inexpensive to manufacture and effective for the purposes intended.

Another object is to provide a thermoplastic micrometer attachment device of another embodiment of the present invention which will permit the reading of the graduations on the hub of the micrometer without obscuring any part of the scale.

The above and other features, objects and advantages of the present invention will be fully understood from the following description considered in connection with the accompanying illustrative drawings.

Figure 1:
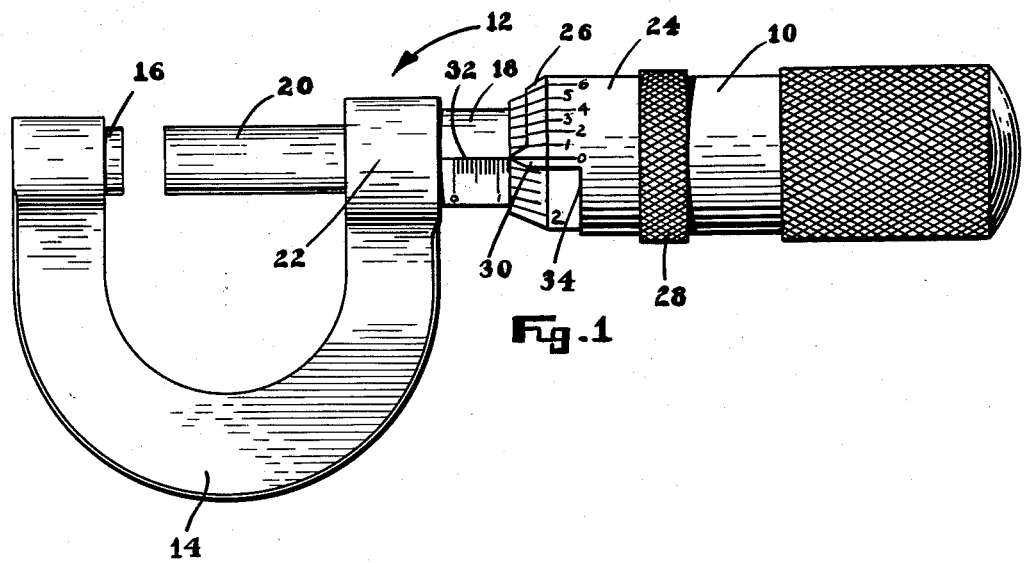
Figure 2:
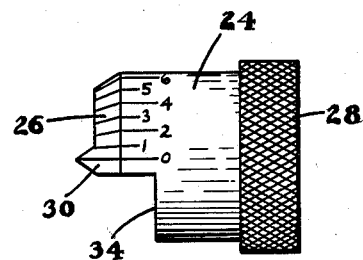
Figure 4:
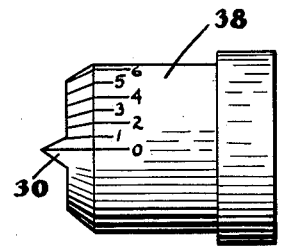
Figure 5:
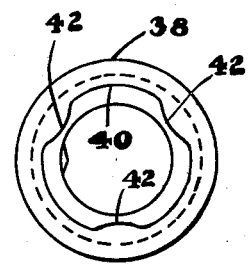
Figure 3:
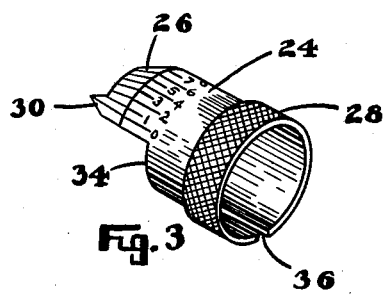

Fig. 1 is a side elevation view of a micrometer with the attachment device embodying the present invention thereon, Fig. 2 is a side elevation view of the attachment device alone, Fig. 3 is a perspective view of the attachment device taken from the rear thereof, Fig. 4 is a side elevation view of another embodiment of the present invention in thermoplastic and Fig. 5 is an end elevation view of the embodiment shown in Fig. 4.

Referring more particularly to the drawing and especially to Figs. 1, 2 and 3, the micrometer attachment device embodying the present invention is inserted over a rotary, knurled cylindrical thimble or barrel 10 of a conventional micrometer referred to generally by the numeral 12 having at one end an annular graduated scale and further including a yoke 14 which is provided at one end with an anvil 16. Projecting from the other end of yoke 14 is the usual hub 18 with a linear graduated scale thereon. A spindle or screw 20 which is journalled in the bearing 22 of the yoke 14 is operated by means of the knurled barrel 10 in the conventional manner.

A hollow, split, cylindrical sleeve 24 comprising the micrometer attachment device embodying the present invention is mounted upon the thimble 10 and surrounds the same. Sleeve 24 is provided with a semi-circular graduated scale on the tapered, angular forward part 26 of the sleeve 24. The rear part 28 of the sleeve 24 is provided with a knurled annular band. One end of the tapered forward part 26 is provided with an index 30 which may be brought to coincide with the horizontal line 32 on the linear graduated scale of the hub 18. Sleeve 24 also has an offset portion 34 and a longitudinal split 36.

In operation, the micrometer 12 is positioned on a work piece, the spindle 20 being moved rectilinearly by rotating the thimble 10 by means of the sleeve 24. In this regard, sleeve 24 is grasped by the knurled annular band in the rear part 28. It is to be noted that sleeve 24 is preferably in the position on the thimble 10 as illustrated in Fig. 1 and the friction between the inner surface of the sleeve 24 and the outer surface of the thimble 10 which are in intimate engagement permits the spindle 20 to be driven by the sleeve 24. When the spindle 20 is moved rectilinearly to the correct measuring position on the work piece, the sleeve 24 commences to slip on the thimble 10 thereby stopping the rotation of the thimble 10. Thus, the sleeve 24 acts as a customary ratchet stop which may be attached to the conventional micrometer. The offset portion 34 of the sleeve 24 then permits the scale reading on the thimble to be uncovered and read. In this regard, the sleeve 24 is rotated until the proper scale reading in thousandths may be seen on the thimble 10. The sleeve 24 is then rotated again until the index 30 is brought into alignment with the horizontal line 32 on the linear graduated scale of the hub 18. Consequently, the vernier scale on the sleeve 24 may be read to give the operator the complete and accurate measurement of the work piece. It is also possible to remove the micrometer from the work piece without disturbing the setting of the micrometer, thus an accurate measurement of the work piece is assured.

The embodiment of the present invention shown in Figs. 4 and 5 is a sleeve 38 which is preferably made of a clear, transparent plastic of excellent optical quality. Sleeve 38 has an irregular internal periphery 40 which contacts the thimble 10 preferably at three pressure points 42. It should be noted that sleeve 38 fits over the thimble 10 and is manipulated in the same manner as sleeve 24, however it is not necessary to have an offset portion in sleeve 38 since the reading on the thimble can be made through the clear plastic.

The micrometer attachment device embodying the present invention although of simple construction permits the double function of a vernier scale reading and ratchet stop.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. An attachment device for a micrometer having a rotatable thimble, comprising a sleeve rotatably mounted on the thimble of said micrometer, said sleeve being provided with a semi-circular vernier graduated scale on the forward part thereof, and an index extending laterally from said sleeve and adapted to mark the commencement of said graduated scale, said sleeve being adapted to frictionally drive said thimble upon the application of pressure and rotational movement thereto whereby upon correct measuring engagement of the micrometer with a work piece said sleeve stops rotating said thimble and said vernier scale may be read.

2. An attachment device for a micrometer having a rotatable thimble comprising a metal sleeve rotatably mounted on the thimble of said micrometer, said sleeve being provided with a semi-circular vernier graduated scale on the forward part thereof and a knurled gripping portion on the rear part thereof, and an index extending laterally from said sleeve and adapted to mark the commencement of said graduated scale, said sleeve being adapted to frictionally drive said thimble upon the application of pressure and rotational movement thereby upon correct measuring engagement of the micrometer with a work piece said sleeve stops rotating said thimble and said vernier scale may be read.

3. An attachment device for a micrometer having a rotatable thimble comprising a cylindrical, metallic, split sleeve rotatably mounted on the thimble of said micrometer, said sleeve being provided with a semi-circular vernier graduated scale on the forward part thereof, and an index extending laterally from said sleeve and adapted to mark the commencement of said graduated scale, said sleeve being adapted to frictionally drive said thimble upon the application of pressure and rotational movement thereto whereby upon correct measuring engagement of the micrometer with a work piece said sleeve stops rotating said thimble and said vernier scale may be read.

4. An attachment device for a micrometer having a rotatable thimble comprising a cylindrical split sleeve rotatably mounted on the thimble of said micrometer, said sleeve being provided with a semi-circular vernier graduated scale on the forward part thereof and a knurled gripping portion on the rear part thereof, a semi-circular portion of said forward part being offset from the portion of said forward part having said vernier scale thereon, and an index extending laterally from said forward part and adapted to mark the commencement of said graduated scale, said sleeve being adapted to frictionally drive said thimble upon the application of pressure and rotational movement thereto whereby upon correct measuring engagement of the micrometer with a work piece said sleeve stops rotating said thimble and said vernier scale may be read.

5. An attachment device for a micrometer having a rotatable thimble comprising a clear plastic sleeve rotatably mounted on the thimble of said micrometer, said sleeve being provided with a semi-circular vernier graduated scale on the forward part thereof, and an index extending laterally from said sleeve and adapted to mark the commencement of said graduated scale, said sleeve being adapted to frictionally drive said thimble upon the application of pressure and rotational movement thereto whereby upon correct measuring engagement of the micrometer with a work piece said sleeve stops rotating said thimble and said vernier scale may be read.

6. An attachment device for a micrometer having a rotatable thimble comprising a clear plastic sleeve rotatably mounted on the thimble, said sleeve being provided with a semi-circular, vernier, graduated scale on the forward part thereof, an index extending laterally from said sleeve and adapted to mark the commencement of said graduated scale, said sleeve having an irregular internal circumference forming at least three pressure points, and said sleeve being adapted to frictionally drive said thimble through said pressure points upon the application of pressure and rotational movement to said sleeve whereby upon correct measuring engagement of the micrometer with a work piece said sleeve stops rotating said thimble and said vernier scale may be read.

References Cited in the file of this patent

UNITED STATES PATENTS 1,288,788    Zimmermann _____ Dec. 24, 1918

FOREIGN PATENTS 126,259    Great Britain _____ May 8, 1919